(12) United States Patent
Mahavadi et al.

(10) Patent No.: US 12,529,678 B2
(45) Date of Patent: Jan. 20, 2026

(54) SYSTEMS AND METHODS FOR EVALUATION OF A TARGET FLUID

(71) Applicant: Schlumberger Technology Corporation, Sugar Land, TX (US)

(72) Inventors: Sharath Chandra Mahavadi, Cambridge, MA (US); Dominic Vincent Perroni, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/820,640

(22) Filed: Aug. 30, 2024

(65) Prior Publication Data

US 2025/0076248 A1    Mar. 6, 2025

Related U.S. Application Data

(60) Provisional application No. 63/579,524, filed on Aug. 30, 2023.

(51) Int. Cl.
*G01N 27/447* (2006.01)
*G01N 1/10* (2006.01)
*G01N 33/28* (2006.01)

(52) U.S. Cl.
CPC ......... *G01N 27/44756* (2013.01); *G01N 1/10* (2013.01); *G01N 33/2823* (2013.01); *G01N 2001/1031* (2013.01)

(58) Field of Classification Search
CPC ....... G01N 27/44756; G01N 27/44791; G01N 33/28; G01N 33/2835; G01N 33/2858; G01N 1/10; G01N 2001/1031; G01N 33/2823

See application file for complete search history.

(56) References Cited

U.S. PATENT DOCUMENTS

| 4,727,936 | A  | 3/1988  | Mioduszewski |
| 6,670,605 | B1 | 12/2003 | Storm, Jr. |
| 9,976,417 | B2 | 5/2018  | Mahavadi |

(Continued)

FOREIGN PATENT DOCUMENTS

| NO | 345901 B1    | 10/2021 |
| WO | 2006103312 A1 | 10/2006 |

(Continued)

OTHER PUBLICATIONS

Excedr, "Capillary Electrophoresis: Overview & Applications", last updated on May 4, 2023, downloaded from https://www.excedr.com/resources/capillary-electrophoresis-overview (Year: 2023).*

(Continued)

*Primary Examiner* — Alexander S Noguerola
(74) *Attorney, Agent, or Firm* — Jeffrey D. Frantz

(57) ABSTRACT

A system may obtain one or more samples of an analysis fluid obtained at a predetermined location and containing a target fluid. A system may place the one or more samples into a capillary electrophoresis device. A system may determine a concentration of at least a target ion in the target fluid of the one or more samples using the capillary electrophoresis device. A system may evaluate at least one criterion relative to an extraction plan for extracting the target ion at the location based on the determined concentration.

19 Claims, 5 Drawing Sheets

(56) References Cited

U.S. PATENT DOCUMENTS

| | | |
|---|---|---|
| 10,018,590 B2 | 7/2018 | Mahavadi |
| 11,169,114 B2 | 11/2021 | Mahavadi |
| 11,941,128 B2 | 3/2024 | Andersen |
| 2003/0132113 A1 | 7/2003 | Sarme |
| 2006/0163069 A1 | 7/2006 | Prak |
| 2009/0269767 A1 | 10/2009 | Soderlund |
| 2010/0068605 A1 | 3/2010 | Harris |
| 2014/0239224 A1 | 8/2014 | Burba |
| 2015/0114837 A1 | 4/2015 | Mahavadi |
| 2015/0197830 A1 | 7/2015 | Chon |
| 2017/0045476 A1 | 2/2017 | Mahavadi |
| 2017/0102370 A1 | 4/2017 | Alber |
| 2019/0120791 A1 | 4/2019 | Al-Gouhi |
| 2019/0226336 A1 | 7/2019 | Benson |
| 2019/0248667 A1 | 8/2019 | Featherstone |
| 2020/0316557 A1 | 10/2020 | Boualleg |
| 2021/0086400 A1 | 3/2021 | Andersen |
| 2022/0055910 A1 | 2/2022 | Jariwala |
| 2023/0125398 A1 | 4/2023 | Abdelaal |

FOREIGN PATENT DOCUMENTS

| | | |
|---|---|---|
| WO | 2009137834 A2 | 11/2009 |
| WO | 2012044163 A1 | 4/2012 |
| WO | 2015023917 A1 | 2/2015 |
| WO | 2018081506 A1 | 5/2018 |
| WO | 2018183555 A1 | 10/2018 |
| WO | 2023009888 A1 | 2/2023 |
| WO | 2023022627 A2 | 2/2023 |
| WO | 2023177994 A1 | 9/2023 |
| WO | 2023183546 A1 | 9/2023 |

OTHER PUBLICATIONS

Renew, J., and T. Hansen. 2017. "Geothermal thermoelectric generation (G-TEG) with integrated temperature driven membrane distillation and novel manganese oxide for lithium extraction." United States. (Year: 217).*

Ian Warren, "Techno-Economic Analysis of Lithium Extraction from Geothermal Brines." Technical Report NREL/TP-5700-79178 May 2021 (Year: 2021).*

Toba et al., "U.S. lithium resources from geothermal and extraction feasibility," Resources, Conservation and Recycling, vol. 169, Jun. 2021, 105514 (Year: 2021).*

Gene Culver, "Chapter 6—Drilling and Well Construction," in Geothermal Direct Use Engineering and Design Guidebook, Paul Lienau and Ben Lunis editors, Geo-Heat Center, Oregon Institute of Technology, Klamath Falls, Oregon 97601, Published—Mar. 1989 (Year: 1989).*

"Geothermal Energy Abstract Sets", Special Report No. 14, Published by Geothermal Resources Council, Under Grant No. DE-FGO3 ~~FII718 United States Department of Energy, Compiled and Edited by Claudia Stone, 1984-1985 (Year: 1985).*

Finger et al., "Handbook of Best Practices for Geothermal Drilling," Sandia Report SAND2010-6048, Unlimited Release, Printed Dec. 2010 (Year: 2010).*

Stringfellow, W.T.; Dobson, P.F. Technology for the Recovery of Lithium from Geothermal Brines. Energies 2021, 14, 6805. https://doi.org/10.3390/en14206805, Published: Oct. 18, 2021 (Year: 2021).*

Ross et al., "Salton Sea Scientific Drilling Project—A Summary of Drilling and Engineering Activities and Scientific Results," Final Report, Apr. 1992, The University of Utah Research Institute (Year: 1992).*

Turkia, et al., Online Capillary Electophoresis for Monitoring Carboxylic Acid Production by Yeast during Bioreactor Cultivations, Anal. Chem. 2013, 85, 9705-97.

Science Direct, (Sep. 3, 2025), AI-generated definition of "Stimulation Fluid" by Science Direct AI search [Large language model], downloaded from the internet at https://www.sciencedirect.com/topics/engineering/stimulation-fluid, 11 pages.

* cited by examiner

SYSTEMS AND METHODS FOR EVALUATION OF A TARGET FLUID

CROSS-REFERENCE TO RELATED APPLICATIONS

The present application claims priority to and the benefit of U.S. PROVISIONAL PATENT APPLICATION No. 63/579,524 filed Aug. 30, 2023, entitled SYSTEMS AND METHODS FOR EVALUATION OF A TARGET FLUID, the entirety of which is incorporated herein by reference.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Critical minerals are essential components in many carbon-reduced or carbon-neutral technologies. For example, lithium is a key element in energy storage. For instance, electrical storage devices, such as batteries, supercapacitors, and other devices commonly use lithium to mediate the storage and release of chemical potential energy as electrical current. As demand for renewable, but non-transportable, energy sources such as solar and wind energy grows, demand for technologies to store energy generated using such sources also grows.

Supply of many target critical minerals is currently forecast to run behind demand, and prices for many target critical minerals currently outstrip even the most optimistic forecasts. While prices are quite volatile as the global market develops, target critical minerals prices are expected to remain high as applications continue to develop.

Target ions (such as metal ions that can be processed to form such critical minerals) may be recovered from brines that are found in the environment. A brine is defined here as any solution of salt. Brines may be subsurface fluid extracted from geological formation, seawater, brackish water, leach fluids, waste fluids, etc.

Knowing and estimating an amount of a target ion in the brine is useful in order to evaluate the potential for extraction of a predetermined site, assess the feasibility and/or profitability of such site and/or appropriately design an extraction flowsheet.

SUMMARY

In some aspects, the techniques described herein relate to a method of evaluating a target fluid composition, the method including: obtaining one or more samples of an analysis fluid obtained at a predetermined location and containing a target fluid; placing the one or more samples into a capillary electrophoresis device; determining a concentration of at least a target ion in the target fluid of the one or more samples using the capillary electrophoresis device; and evaluating at least one criterion relative to an extraction plan for extracting the target ion at the location based on the determined concentration.

In some aspects, the techniques described herein relate to a system for evaluating a target fluid composition including: a capillary electrophoresis device; a sampling apparatus configured to obtain one or more samples of an analysis fluid containing the target fluid and a drilling fluid of known initial composition at a predetermined location and to place it in the capillary electrophoresis device; and a processing device including one or more processors configured to: determine a concentration of at least a target ion in the target fluid of the one or more samples using the capillary electrophoresis device, and evaluate at least a criterion relative to an extraction plan for extracting the target ion at the location based on the determined concentration.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
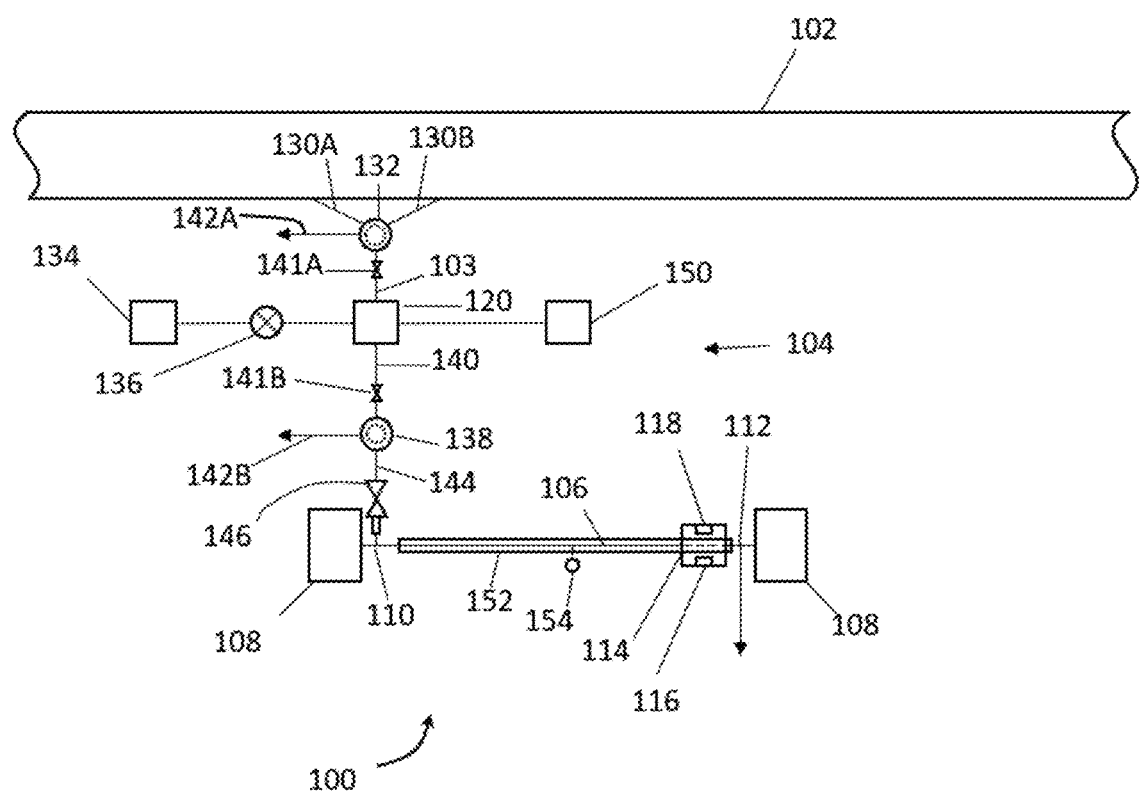
FIG. 1 is a schematic diagram of a capillary electrophoresis device in accordance with at least one embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A method for evaluating a target fluid composition is provided in the following disclosure. The method relates more specifically to obtain one or more samples of an analysis fluid that contains the target fluid, placing the samples into a capillary electrophoresis (CE) device, determining a concentration of at least a target ion in the sample using the CE device and evaluating at least a criterion relative to an extraction plan for extracting the target ion at the location based on the determined concentration.

The analysis fluid may be a brine collected at the location, or a wellbore fluid used in the wellbore location drilled in a geological formation at the location and returning from the geological formation. The brine may include seawater, brackish water, leach fluids, waste water, a subsurface fluid or a combination thereof. The brine is generally the target fluid, the concentration of the target ion in the target fluid may be inferred directly from the sample.

When the brine is a subsurface fluid, it may be more complicated to collect a brine sample. In an embodiment, obtaining one or more samples includes lowering a downhole tool and collecting the sample downhole. This may be performed using a sampling apparatus and collecting the sample downhole includes contacting the sampling apparatus with the geological formation so that it is in fluid communication with the geological formation and withdrawing fluid from the geological formation. Sampling apparatuses are well-known in the art and examples of such tool include a Modular Formation Tester (MDT) tool commercially available from SLB.

When the brine is subsurface brine, another possibility is to analyze a wellbore fluid as the analysis fluid, knowing that said wellbore fluid returning to the surface after having circulated through the wellbore contains small amount of subsurface fluid that has been mixed with the wellbore fluid and inferring from the concentration of the at least one target ion in the wellbore fluid an indication of a concentration of the at least one target ion in the subsurface fluid contained in the wellbore fluid. The wellbore fluid may be a drilling fluid such as drilling mud, injected during drilling of the wellbore, a stimulation fluid, injected in the wellbore for creating fracture in the subsurface formation, and more generally any fluid that is injected in the wellbore.

The method will be described in more details in relationship with the embodiment where the analysis fluid is a wellbore fluid, as the inference of the subsurface fluid concentration is more complex.

Once the concentration of the target ion (and possibly other species such as impurity species) has been inferred, it is used to evaluate at least a criterion relative to an extraction plan for extracting the target ion at the location based on the determined concentration. Impurity species may include organics, such as hydrocarbons, sulfide species such as $H_2S$, $HS^-$ or $S^{2-}$, derivatives containing silicon and silica species, divalent ions such as magnesium and calcium, aluminum, barium, strontium; transition metals such as iron, manganese, zinc; boron, strontium, derivatives containing phosphorus and phosphate (to the extent such species is not the target ion).

Such criterion may relate to profitability of the target ion extraction. Indeed, depending on the configuration at the location, and on the target ion concentration and/or other impurity species in the target fluid, a techno-economical assessment of the extraction may be performed and a decision on the target ion extraction at the predetermined location may be taken.

Such criterion may also relate to the extraction flowsheet design. Indeed, an extraction flowsheet is highly dependent on the target fluid composition and knowing this composition in advance enables to design the extraction flowsheet in an optimal fashion. Based on this composition, for instance a target ion extraction process may be selected (for instance, ion exchange, adsorption/desorption, electrochemical extraction) and/or the parameters of the target ion extraction process may be determined (for instance, flow, extraction time, etc.). The concentration of the target ion as well as the ratio of the target ion to one or more specific impurity species are very interesting parameters that enable to select the extraction process and its parameters. Based on this composition (and especially the impurity species concentration), the presence of one or more additional stages in the extraction flowsheet may be determined, such as concentration and/or impurity removal before extraction and/or the nature of such concentration and impurity removal stages.

Such criterion may also relate to an evaluation plan in the case where the analysis fluid is a wellbore fluid. Indeed, having a first understanding of the subsurface fluid composition using the wellbore fluid is helpful, but this analysis is not as accurate as a downhole measurement. Hence, based on the concentration of the target ion in the samples, the method may include selecting one or more additional evaluation measurements, and/or collecting one or more samples of subsurface fluid at one or more target depths in the wellbore to obtain additional data relative to the subsurface fluid before proceeding with the extraction process evaluation and/or design. For a better evaluation plan, the several samples of the wellbore fluid may be evaluated at different times using the CE, and depth matching is performed to identify a subsurface fluid composition relative to known depths.

In some embodiments, the analysis fluid is a wellbore fluid, and evaluating the criteria may be relative to the wellbore design. The method may, for instance, include selecting one or more extraction zones, and the method may include scaling the selected extraction zones within the wellbore so that fluid is extracted solely from the selected extraction zones. Indeed, the wellbore fluid analysis and depth matching (as will be discussed later) enable identification of the wellbore zones where the brine or other subsurface fluid can be sampled from the formation in order to isolate it from the other fluids that are in fluid communication with the wellbore in order to avoid contamination by other fluids.

Hereinafter is described a CE system used to evaluate a target ion concentration in a sample from an analysis fluid. The CE system is designed for inline measurement. In some embodiments, other type of CE systems (and for instance not inline) are used in the scope of the disclosure.

As discussed hereinabove, CE may be used to detect and monitor target ion (and possibly other species, such as impurity species) concentration in brine or other subsurface fluid streams.

FIG. 1 is a schematic diagram of an inline CE device (also named analyzer in the following) 100 for a brine stream. While the present embodiment described in relation to FIG. 1 describes a brine stream, it should be understood that the described components may be applicable to other subsurface fluids. The brine stream is generally depicted flowing in a pipe 102, with the analyzer 100 coupled to the pipe by a sampling system 104. The sampling system 104 is depicted as obtaining samples from two sampling locations 130A and 130B, but a sampling system may be designed to obtain fluid for only one or more than two locations. One sampling location, or more than two sampling locations, can be used with one analyzer 100. A selection valve 132 is operable to draw samples selectively from either sampling location 130A or 130B. A sample line 103 brings material from the selection valve 132 to a sample chamber 120, which stages the sample for analysis. A solvent source 134 is coupled to the sample chamber 120 by a pump 136 so that solvent can be provided to the sample chamber 120 to dilute the sample, if desired. The solvent can also be used to flush the sample chamber 120 between samples. A second selection valve 138 is coupled to an outlet 140 of the sample chamber 120. Flush material can be routed from the solvent source 134 to the sample chamber 120, and then to the first selection valve 132 for disposal along a first flush line 142A. Alternately, flush material can be routed from the solvent source 134 to the sample chamber 120, and then to the second selection valve 138 for disposal along a second flush line 142B or to an analyzer feed line 144. A first block valve 141A can be operated to route the flush material along the first flush line 142A, and a second block valve 141B can be operated to route the flush material along the second flush line 142B. The sampling system 104 can thus have zero, one, two, or more flush lines. A sample fitting 146 may be coupled to the analyzer feed line 144 to allow for disconnecting the analyzer 100 from the sampling system 104, in the event a portable analyzer 100 is used. Note that other valves, tubes, and/or pipes that may be appropriate for flowing samples to and from the analyzer 100 are omitted for simplicity of explanation.

The analyzer 100 generally has a capillary tube 106 juxtaposed with an electric field source 108 that when energized creates an electric field oriented along an axis of the capillary tube 106. The electric field source 108 comprises a cathode and an anode positioned at either end of the capillary tube 106. In most cases, the cathode and anode are immersed in the fluid being analyzed to propagate the electric field through the fluid. A power supply (not shown) powers the electric field source 108. The capillary tube 106 has an entrance end 110 and an exit end 112. A detector cell 114 is coupled to the capillary tube 106 at or adjacent to the exit end 112. The detector cell 114 applies probe energy to the fluid in the capillary tube 106 to produce a signal representing the composition of the fluid in the capillary tube 106. The detector cell 114 may be a UV transmission cell, an electrical conductivity cell, a mass spectrometry cell, or other suitable detector type. The detector cell 114 generally comprises an energy source 116 and a detector 118 oriented to couple the probe energy into the fluid within the capillary tube 106 and to detect energy emerging from the capillary tube 106 following interaction with the fluid therein. Effect of the fluid on the energy is resolved by the detector 118 as a signal, or a plurality of signals, such as a spectrum or an intensity of one wavelength or a small collection of wavelengths, that relates to the composition of the fluid.

In one embodiment, the energy source 116 is an ultraviolet light (UV) source and the detector 118 is a UV detector. The UV source may use a single wavelength or multiple wavelengths. In some cases, a broadband UV source may be used, and the detector 118 may be a spectrometer to resolve transmission of different wavelengths. A usable CE instrument is commercially available from multiple suppliers. UV wavelengths such as 200 nm and 214 nm are usable. In other embodiments, the energy source may be an electric current source and the detector may be a conductivity detector. In still other embodiments, the energy source may be a magnet to deflect ions moving through the magnetic field of the magnet toward an ion detector, similar to a mass spectrometer. The ion detector can differentiate ions by migration time or detection location.

The sampling system 104 has a sample chamber 120 that holds a fluid to be routed to the capillary tube 106. The sample chamber 120 collects a sample of a prescribed size for flowing through the capillary tube 106. The sample is hydrodynamically injected into the capillary tube 106 from the sample chamber 120, either by applying positive pressure or vacuum to the sample chamber 120, while electric field is applied by the source 108. Here, a pressure source 150 is fluidly coupled to the sample chamber 120 to provide pressure to hydrodynamically inject the sample from the sample chamber 120 into the capillary tube 106. The pressure source 150 can provide a pressurized gas into the sample chamber 120 to hydrodynamically inject the sample from the sample chamber 120 into the capillary tube 106 without altering the liquid composition of the sample. The sample can also be electrokinetically injected into the capillary tube 106 by fluidly connecting the sample chamber 120 to the capillary tube 106, maintaining neutral hydrodynamic pressure from the sample chamber 120 through the capillary tube 106, and coupling the electric field into the fluid. The pressure source 150 can be configured to maintain neutral pressure in the sample chamber 120 during the injection process. The electric field acts to affect the rate at which species in the sample arrive at the detector cell 114. The detector cell 114 records a time-series of transmission intensity, while the sample flows through the capillary tube 106, which can be related to composition of the sample.

The analyzer 100 can be operated under isothermal conditions by controlling temperature within the capillary tube 106. A thermal control member 152 can be coupled to the capillary tube 106 to control temperature within the capillary tube 106. The thermal control member 152 can be a fluid jacket or resistive heat jacket, or both, for raising or lowering a temperature of the fluid flowing through the capillary tube 106 in order to control the temperature of the fluid. A fluid jacket can use a liquid or gas as a thermal control medium to exchange thermal energy with the fluid flowing through the capillary tube 106 to heat or cool the fluid flowing through the capillary tube 106 to control the temperature of the fluid flowing through the capillary tube 106 to maintain isothermal operating conditions for the analyzer 100. One or more temperature sensors 154 can be coupled to the capillary tube 106 for sensing the temperature of the fluid flowing through the capillary tube 106. The thermal control member 152 can be operated based on readings from the one or more temperature sensors 154 to maintain isothermal conditions for operation of the analyzer 100. The analyzer 100, with sampling system 104, is an example of a CE system that can be used to detect, monitor, and control composition of material flowing through the pipe 102. Any type of CE system can be used in the scope of the disclosure.

The sampling system 104 is configured, in this case, to operate substantially independently from the analyzer 100. The sampling system 104 is configured to automatically collect and prepare a sample for analysis by the analyzer 100 without impacting operation of the analyzer 100. To prepare a sample for analysis, a controller (not shown), or a human operator, can open valve 141A to allow flow of fluid from the pipe 102 to the sample chamber 120 through the sample line 103. The selection valve 132 can be set to allow flow from one or both the sampling locations 130A and 130B to the sample chamber 120. Solvent can be routed to the sample chamber 120 from the solvent source 134. One or both of the valve 141B and the valve associated with the sample fitting 146 can be kept closed to isolate the sampling system 104 from the analyzer 100 while the sample is being prepared. The pressure source 150, or other means, can be used to maintain a target pressure in the sample chamber 120 while fluids are flowed into the sample chamber 120. In an alternate method, a sample can be prepared in the sample chamber 120 by simultaneously flowing fluid from the pipe 102 through the sample chamber 120 to the second selection valve 138 and into the second flush line 142B and flowing solvent from the solvent source 134 through the sample chamber 120 to the second selection valve 138 and the second flush line 142B. When a steady flow state is established through the sample chamber 120, valve 141B can be closed to stop flow and valve 141A can then be closed to isolate the sample. When the analyzer 100 is prepared to accept the sample, the second selection valve 138 can be set to flow from the sample chamber 120 to the analyzer 100, the valve 141B can be opened, and the pressure source 150 can be used to inject the sample from the sample chamber 120 to the analyzer 100 through the analyzer feed line 144.

The analyzer 100 can be calibrated for analyzing one or more specific target ion, such as lithium, in brine streams in three general ways. First, a known solution can be used as a calibrant. For lithium, the solution may be a solution of a lithium salt, such as lithium chloride. A known amount of lithium salt is dissolved in deionized water to yield a solution of known lithium concentration. Standard solutions can also be obtained from vendors of such materials. When this solution is measured using the analyzer 100, the resulting signature can be related to the known lithium concentration. Multiple such calibrants having different lithium concentration can be analyzed to develop a calibration curve. Second, a known mixture of species including target ion and other species can be prepared and analyzed. For example, a known quantity of a salt containing lithium, for example lithium chloride, along with known quantities of calcium, magnesium, sodium, which may be chlorides and/or other anions, can be added to deionized water to prepare calibrants for analysis. In this way, a multivariate calibration curve can be constructed. Most modern instruments have software or firmware for calibration of this type. A third way of calibrating the instrument is to obtain wild brine samples from a natural source, analyze them using well-characterized procedures to determine a high-confidence composition of the natural source, and then analyze them using the analyzer 100. Hybrid methods can be used also, for example a natural brine sample that is adjusted in some way to optimize the calibration. In these ways, the results of the analyzer 100 can be related to another well-known analytical technique.

In view of the above the CE device is able to infer target ion concentration in the sample and therefore in the analysis fluid. When the analysis fluid is the brine, it can directly infer the concentration in the brine and the one or more criteria discussed above may be evaluated based directly on the results of the CE device analysis.

Turning to FIG. 2-5, the method and associated system are described in relationship with the embodiment where the analysis fluid is a wellbore fluid. In that case, as explained above, the analysis fluid is not directly the target fluid but contains amounts (sometimes small amounts) of the target fluid.

As discussed above in relationship with some embodiments, a drilling system may carry out drilling operations to form a wellbore within or into a subterranean formation to recover subsurface fluids (such as hydrocarbons and/or brines including one or more target ions of interest such as lithium, nickel, cobalt, manganese or magnesium) trapped within the subterranean formation. During drilling operations, drilling fluid (e.g., drilling mud) flows through a drill string, out a drill bit at a distal end of the drill string, and then upward through an annular passage between the drill string and a wall of the wellbore. The drilling fluid is generally used for lubrication and cooling of cutting surfaces of the drill bit while drilling generally or drilling-in (e.g., drilling in a targeted petroliferous formation), for transportation of cuttings (e.g., pieces of subterranean formation dislodged by a cutting action of teeth on the drill bit) to the surface, controlling formation fluid pressure to block blowouts, maintaining wellbore stability, suspending solids in the wellbore, minimizing fluid loss into and stabilizing the subterranean formation through which the wellbore is being drilled, fracturing the subterranean formation in the vicinity of the wellbore, displacing fluid within the wellbore with another fluid, cleaning the wellbore, testing the wellbore, treating the wellbore, treating the subterranean formation, transmitting hydraulic horsepower to the drill bit, emplacing a packer, abandoning the wellbore, and/or preparing the wellbore for abandonment, for example. After having carried out its function in the wellbore, the drilling fluid is returned to the surface and to the fluid pits or tanks.

The present embodiments relate to a fluid analysis system that uses CE techniques to determine a concentration of at least a target ion, optionally the concentration of at least an impurity species, and/or optionally the composition of the drilling fluid returning from the wellbore. Indeed, the CE techniques may be used to test for respective concentrations of all components/ingredients in the drilling fluid or other analysis fluid returning from the wellbore (including components/ingredients leached from the subterranean formation such as target ion). The CE techniques may be implemented via a CE device or system that is portable and/or present at a wellsite (e.g., in a vicinity of the wellbore, such as within 25, 50, or 100 meters of the wellbore), and thus, the CE techniques may provide real-time (e.g., substantially real-time, such as within minutes and/or during the drilling operations) quality analysis/control at the wellsite. Notably, the CE techniques may not require and/or do not utilize an addition of any tracer to the drilling fluid to determine the composition of the drilling fluid or other analysis fluid returning from the wellbore. Additionally, the CE techniques may be performed on direct drilling muds (e.g., direct drilling fluids; without filtration), which may reduce a time to test the drilling fluid and/or provide more accurate results (e.g., as compared to titration-based tests).

The CE techniques may provide the respective concentrations of the components of the drilling fluid. The detailed, robust outputs provided by the CE techniques may provide information about a formation composition of the subterranean formation. These and other features of the fluid analysis system are described in more detail herein.

Figure 2:
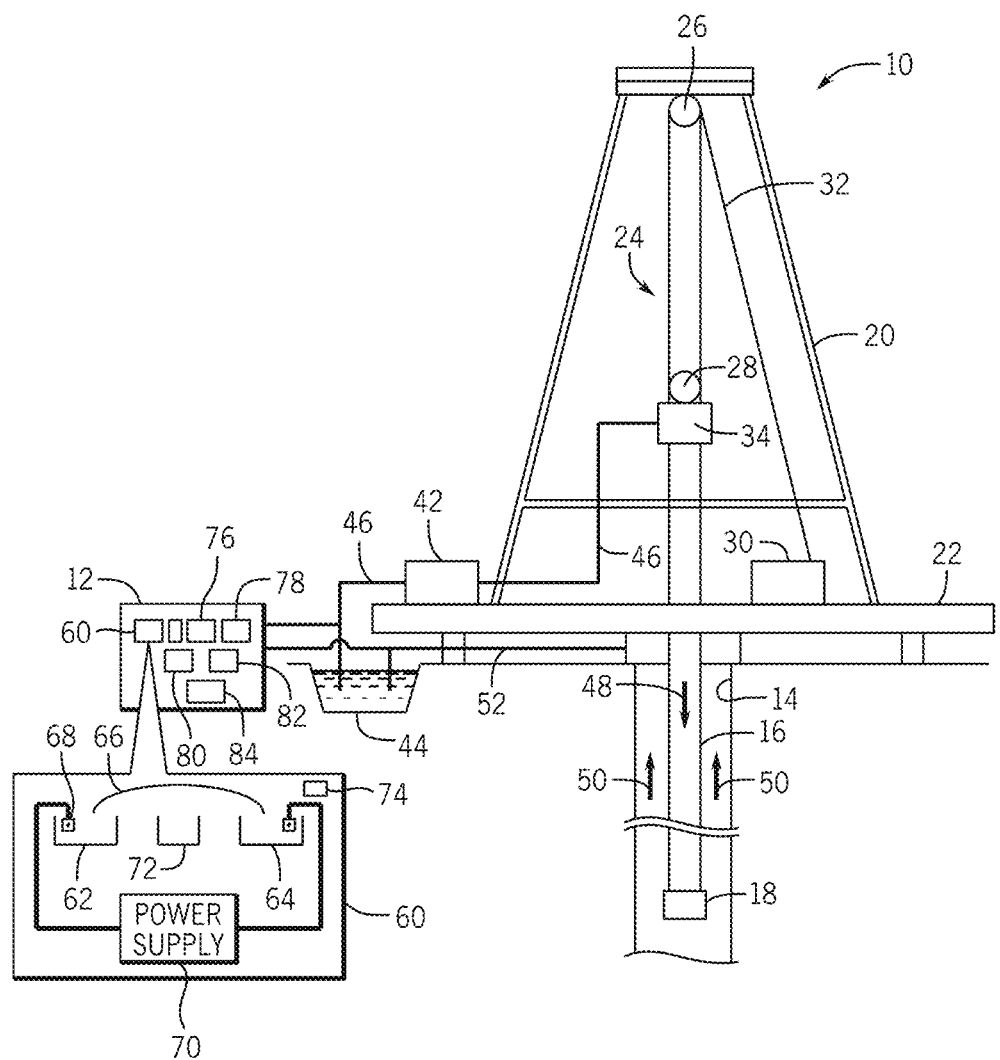
FIG. 2 is a schematic diagram of a drilling system with a fluid analysis system, in accordance with at least one embodiment of the present disclosure.

FIG. 2 is a schematic diagram of a drilling system 10 with a fluid analysis system 12 (e.g., drilling mud analysis system), in accordance with an embodiment of the present disclosure. The fluid analysis system 12 is configured to analyze a composition of a drilling fluid, provide feedback (e.g., visual feedback via a display screen), and/or carry out other tasks to evaluate the subsurface fluid composition. While FIG. 2 illustrates a land-based drilling system to facilitate discussion, it should be understood that the disclosed embodiments may be adapted for use with an offshore drilling system.

As shown, a wellbore 14 is formed in a subterranean formation, and a drill string 16 is suspended within the wellbore 14. The drill string 16 may include a drill bit 18 that cuts through the subterranean formation to form or to drill the wellbore 14. A mast 20 is positioned on a drill floor 22 and over the wellbore 14. A hoisting system 24 includes a crown block 26, a traveling block 28, and a drawworks system 30. A cable 32 (e.g., wire) extends from the drawworks system 30 and couples the crown block 26 to the traveling block 28. In the illustrated embodiment, a top drive 34 is coupled to the traveling block 28. The top drive 34 rotates the drill string 16 as the hoisting system 24 raises and lowers the top drive 34 and the drill string 16 relative to the drill floor 22 to facilitate drilling of the wellbore 14. It should be appreciated that hoisting systems having various other components (e.g., swivels) and/or configurations may be utilized to drive movement of the drill string 16.

A pump 42 (e.g., piston pump) is configured to pump a drilling fluid (e.g., drilling mud; water-based, oil-based, or synthetic-based drilling fluid) into the wellbore 14. For example, the pump 42 may be used to pump the drilling fluid from a drilling fluid tank 44 during drilling operations. In particular, the pump 42 may be used to pump the drilling fluid from the drilling fluid tank 44, through a fluid conduit 46 (e.g., pipe, line), through a port in the top drive 34, and into an interior channel in the drill string 16, as shown by arrow 48. The drilling fluid may exit the drill string 16 via ports in the drill bit 18, and then circulate upwardly through an annular passage between an outer surface (e.g., annular surface) of the drill string 16 and an inner surface (e.g., annular surface) that defines the wellbore 14, as shown by arrows 50. The drilling fluid may then return to the drilling fluid tank 44 via a fluid conduit 52 (e.g., pipe).

It is important to evaluate the concentration of one or more target ions (i.e., that may be extracted) as well as optionally of one or more impurity species (i.e., that may be detrimental to the extraction). The subsurface fluid may be mixed in the wellbore with the drilling fluid and such target ions and/or impurity species that are in the subsurface fluid may be found mixed into or incorporated into the drilling fluid that returns to the surface. Accordingly, the fluid analysis system 12 disclosed herein includes a CE device 60 (or CE system) that enables sampling and testing of the analysis fluid (i.e., including the drilling fluid and a subsurface fluid), such as during the drilling operations and/or nearby the wellbore 14 (e.g., in a vicinity of the wellbore 14, such as within 25, 50, or 100 meters of the wellbore 14). More particularly, the CE device 60 may be configured to analyze the composition of the analysis fluid, such as respective concentrations of target ions and impurity species contained in the analysis fluid. For example, the CE device 60 may be configured to analyze the respective concentrations of one or more additives (e.g., inhibitors), one or more ions, and so on. The CE device 60 may rely upon minimum, or in some cases, no preparation of a sample of the analysis fluid (e.g., no addition of tracers, such as nitrate; supplied directly from the drilling fluid tank 44 and/or any of the fluid conduits 46, 52; without filtration to remove solids).

As shown, the CE device 60 may include a source vial 62, a destination vial 64, a capillary tube 66, electrodes 68, and a power supply 70. The source vial 62, the destination vial 64, and the capillary tube 66 may be filled with an electrolyte, such as an aqueous buffer solution. To introduce a sample (e.g., of the analysis fluid, the drilling fluid), an inlet of the capillary tube 66 may be placed into a sample vial 72 that contains the sample. The sample may be introduced into the capillary tube 66 via capillary action, pressure, siphoning, or electrokinetically, and the inlet of the capillary tube 66 is then returned to the source vial 62.

In some embodiments, migration of components in the sample is initiated by an electric field that is applied between the source vial 62 and the destination vial 64 by the electrodes 68 connected to the power supply 70. In certain CE techniques, ions are pulled through the capillary tube 66 in one direction by electroosmotic flow. The components separate as they migrate due to their different electrophoretic mobility and are detected by a detector 74 (e.g., ultraviolet (UV) or ultraviolet-visible (UV-VIS) absorption detector, mass spectrometer, fluorescence detector, electrochemical detector, conductivity detector, and/or optical detector) near an outlet of the capillary tube 66. An output of the detector 74 may be provided to a processing device or system, which may include a processor 76, a memory device 78, a storage device 80, a communication device 82, and/or an output device 84 (e.g., a speaker, a light emitter, and/or a display screen).

The processor 76 may be any type of computer processor or microprocessor capable of executing computer-executable code. The memory device 78 and the storage device 80 may be any suitable articles of manufacture that can serve as media to store processor-executable code, data (e.g., calibration curves), or the like. These articles of manufacture may represent computer-readable media (e.g., any suitable form of memory or storage) that may store the processor-executable code used by the processor 76 to perform various techniques disclosed herein. The memory device 78 and the storage device 80 may represent non-transitory computer-readable media (e.g., any suitable form of memory or storage). It should be noted that non-transitory merely indicates that the media is tangible and not a signal.

The communication device 82 may be configured to facilitate communication between the fluid analysis system 12 and other components of the drilling system 10 (e.g., via a wired and/or wireless network). For example, the communication device 82 may communicate data, information, alerts, recommendations, and/or control signals to other components of the drilling system 10. The output device 84 may operate as a human machine interface (HMI) to depict visualizations associated with software or executable code being processed by the processor 76. For example, the output device 84 may be a display screen, such as a touch display screen that is also capable of receiving inputs from an operator (e.g., a mud engineer; a human operator). The output device 84 may be any suitable type of display screen, such as a liquid crystal display (LCD) screen, plasma display screen, or an organic light emitting diode (OLED) display screen, for example.

It should be noted that the components described above with regard to the fluid analysis system 12 are merely examples, and the fluid analysis system 12 may include additional or fewer components. In some embodiments, the fluid analysis system 12 may be a distributed system that includes multiple processors. Indeed, as used herein, the term "processing device or system" refers to an electronic computing device or system such as, but not limited to, a single computer, virtual machine, virtual container, host, server, laptop, and/or mobile device, or to multiple electronic computing devices working together to perform the function(s) described herein.

Figure 3:
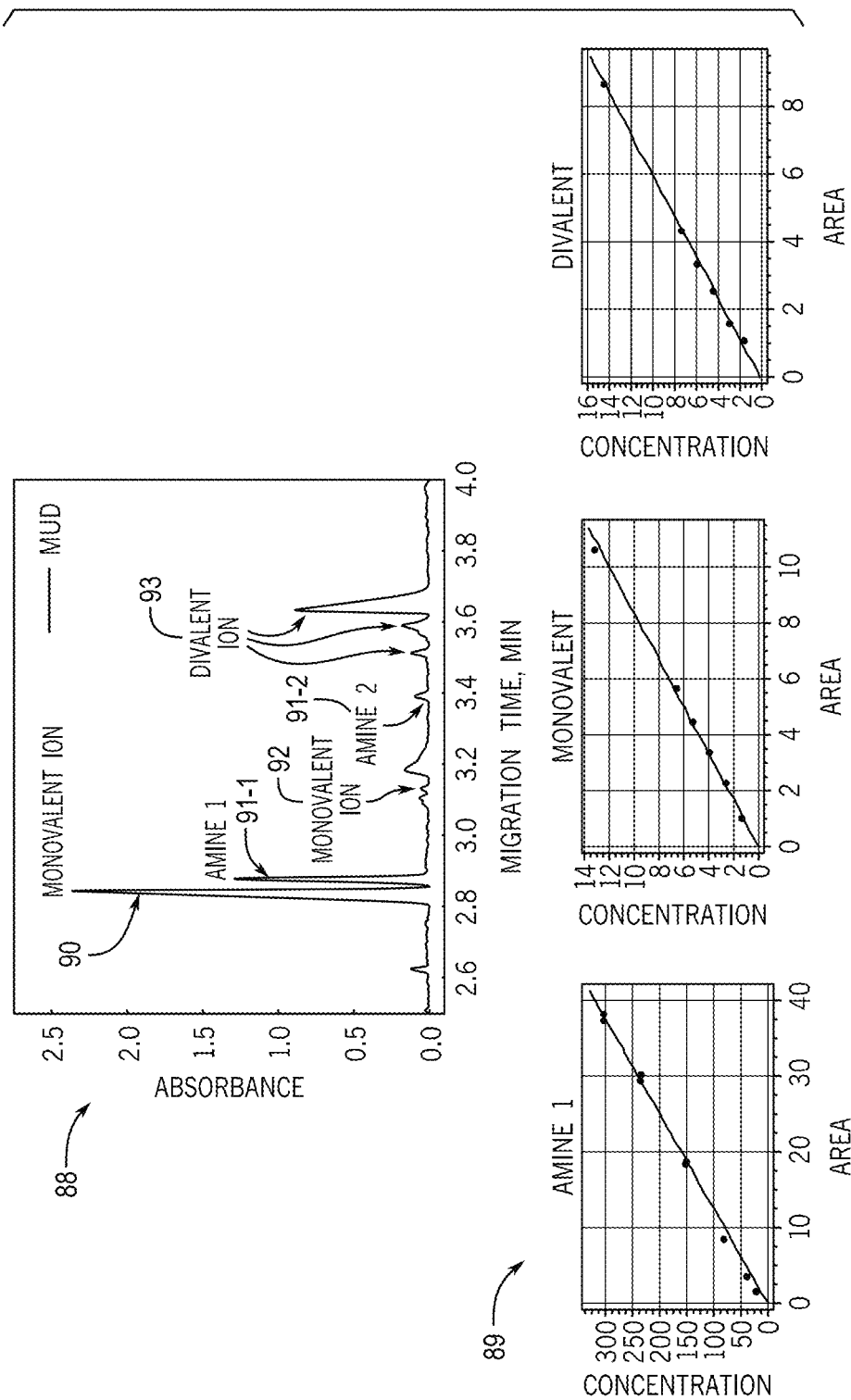
FIG. 3 illustrates examples of graphs that show components of a drilling fluid and calibration curves that are used to determine respective concentrations of the components of the drilling fluid, in accordance with at least one embodiment of the present disclosure.

FIG. 3 illustrates examples of a fluid component graph 88 that shows components of an analysis fluid and calibration graphs 89 with calibration curves that may be used to determine respective concentrations of the components of the analysis fluid, in accordance with an embodiment of the present disclosure. The analysis fluid component graph 88 may be generated based on the output of the detector 74 of FIG. 2 and may be an electropherogram that represents a response of the detector 74 as a function of time.

As shown, separated chemical compounds (e.g., components of the analysis fluid) appear as peaks with different retention times, and each peak may be determined to correspond to a particular separated chemical compound by comparing a respective migration time of each peak with that of a known chemical compound. Furthermore, a respective area under each peak is proportional to a concentration of the separated chemical compound. For example, the calibration graphs 89 may be established for certain components used in the drilling fluid, and then the calibration graphs 89 may be referenced to determine the respective concentration for any of the components of interest that are identified in the electropherogram of the analysis fluid.

As a specific example with reference to the analysis fluid component graph of FIG. 3, various components of a analysis fluid are identified via a first peak 90 that indicates a first ion (e.g., first monovalent ion that can be a target ion or an impurity species), a second peak that indicates a first additive (e.g., first component/element/ingredient, such as an amine 91-1, 91-2, of an inhibitor), a third peak that indicates a second ion (e.g., second monovalent ion 92 that can be a target ion or an impurity species), a fourth peak that indicates a second additive (e.g., second component/element/ingredient, such as an amine, of the inhibitor), a fifth peak that indicates a third ion (e.g., divalent ion 93 that can be a target ion or an impurity species), and so forth. The calibration graphs 89 may be used to correlate the area under each peak to a concentration, and thus, the CE device 60 may output the respective concentrations of the components of the analysis fluid (e.g., a first concentration of the first ion, a second concentration of the first additive, and so on). Advantageously, because CE techniques are able to separate components in this way (e.g., separate multiple amines of the inhibitor), it is possible to effectively track a concentration of the target ion. It should be appreciated that additional separation and/or analysis techniques may be used in conjunction with (e.g., sequentially or at the same time) with the CE techniques to confirm the respective concentration for each of the components in the analysis fluid.

Figure 4:
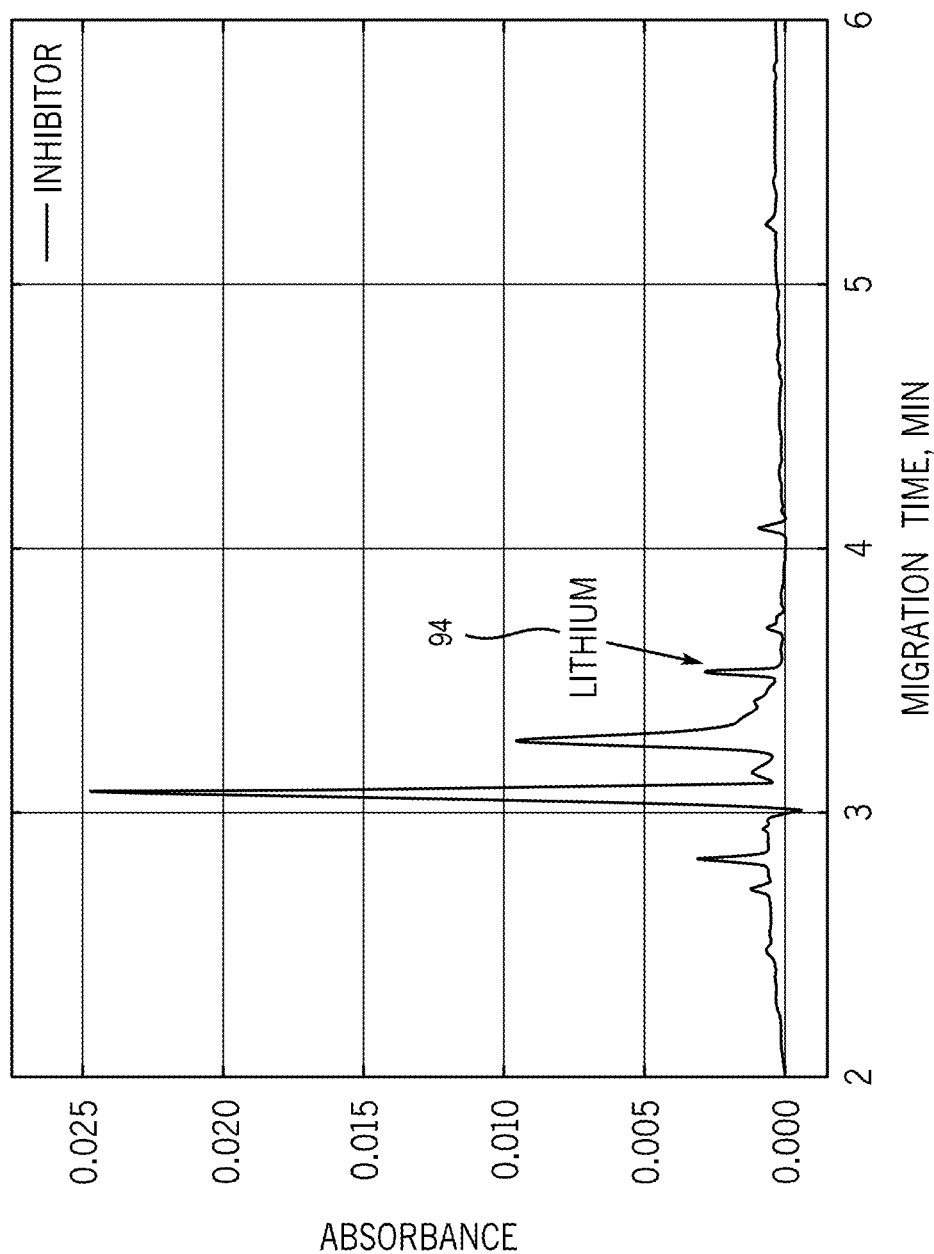
FIG. 4 illustrates an example of a graph that indicates a presence of a precious metal in a subterranean formation, in accordance with at least one embodiment of the present disclosure.

FIG. 4 illustrates an example of a graph that indicates a presence of a target ion, such as a precious metal, collected from a subterranean formation in the target fluid and/or the analysis fluid, in accordance with an embodiment of the present disclosure. In particular, the graph has a peak 94 that indicates a presence of Lithium along with other components of the analysis fluid.

A drilling operation is often a first interaction with the subterranean formation, and analysis of the drilling fluid and other fluids and materials mixed therein (e.g., an analysis fluid) may provide information about components, such as any precious metals, present in the subterranean formation, i.e., in the subsurface fluid. For example, the components in the analysis fluid may be from the subterranean formation (e.g., leached/acquired from the subterranean formation as the drilling fluid circulates in the wellbore). Thus, a comparison of the components in the analysis fluid returned from the wellbore to a known initial composition of the base/initial drilling fluid prior to the drilling operations and/or prior to a particular pass through the wellbore indicate the components in the analysis fluid that are introduced into the drilling fluid from the subterranean formation. Also, if a depth of a drilling fluid return zone is known, the fluid analysis system 12 may generate a log with information about a lithology (e.g., table; diagram; map) of the subterranean formation along with any target ion present in the subterranean formation at the associated depths. In this way, the CE techniques may provide additional information about the subterranean formation, such as the composition of the subterranean formation. Notably, if completed for several wellbores, this may provide additional information about connections between subterranean formations.

Some additional examples of components within the analysis fluid that may be identified via the CE techniques include other target ions than lithium (such as nickel cobalt, manganese or magnesium), impurity species as listed above but also components that are found in the analysis fluid and not in the subsurface fluid, such as chloride, calcium, magnesium, sulfate, potassium, and/or various inhibitors (e.g., amine-based inhibitors; phosphate-containing inhibitors).

It should be appreciated that the CE techniques may be used to monitor concentrations of one or more components of the analysis fluid periodically (e.g., according to a schedule, such as every hour, two hours, 12 hours, or more) and/or in response to certain events (e.g., initiation of drilling operations, upon reaching a certain depth in the wellbore 14, upon reaching certain rheology numbers or thresholds, upon receipt of an input command/request by the operator). Thus, the fluid analysis system 12 may provide multiple updates and/or outputs to guide the drilling operations.

As set forth hereinabove, the system takes sample of the analysis fluid returning from the wellbore but may also take a calibration sample of the initial drilling fluid prior to injection of the initial drilling fluid in the wellbore, in order to account for some of the target ions and/or impurity species (such as calcium or magnesium) that are present in the analysis fluid composition. The composition of the analysis fluid returning from the wellbore taken at a first time is compared to the known initial composition of the drilling fluid entering the wellbore at an earlier second time, where the difference between the first and second time corresponds to the time spent by the drilling fluid in the wellbore. This difference may be calculated using well-known lag time calculation techniques. Such comparison, in some embodiments, isolates the contribution of the target ions and impurity species coming from the subsurface fluid.

As set forth hereinabove, in some embodiments, evaluating the subsurface fluid composition includes correlating, using the analysis of the multiple samples of the analysis fluid, a target ion concentration (and/or impurity species concentration) with depth within the wellbore (i.e., depth matching). Conventional depth matching techniques may be used. In an embodiment, one or more downhole measurements may be used to identify property of the subsurface fluid versus depth, such as conductivity, etc. and the properties may be used for such correlation. When the analysis fluid is used during a drilling phase, it may be considered that the subsurface fluid mixed with the drilling fluid is the fluid from the depth of the formation that is currently being drilled and the correlation may be obtained by using well-known lag time calculation techniques. As discussed, the CE analysis in the case of the wellbore fluid may be completed by analyzing downhole samples.

Figure 5:
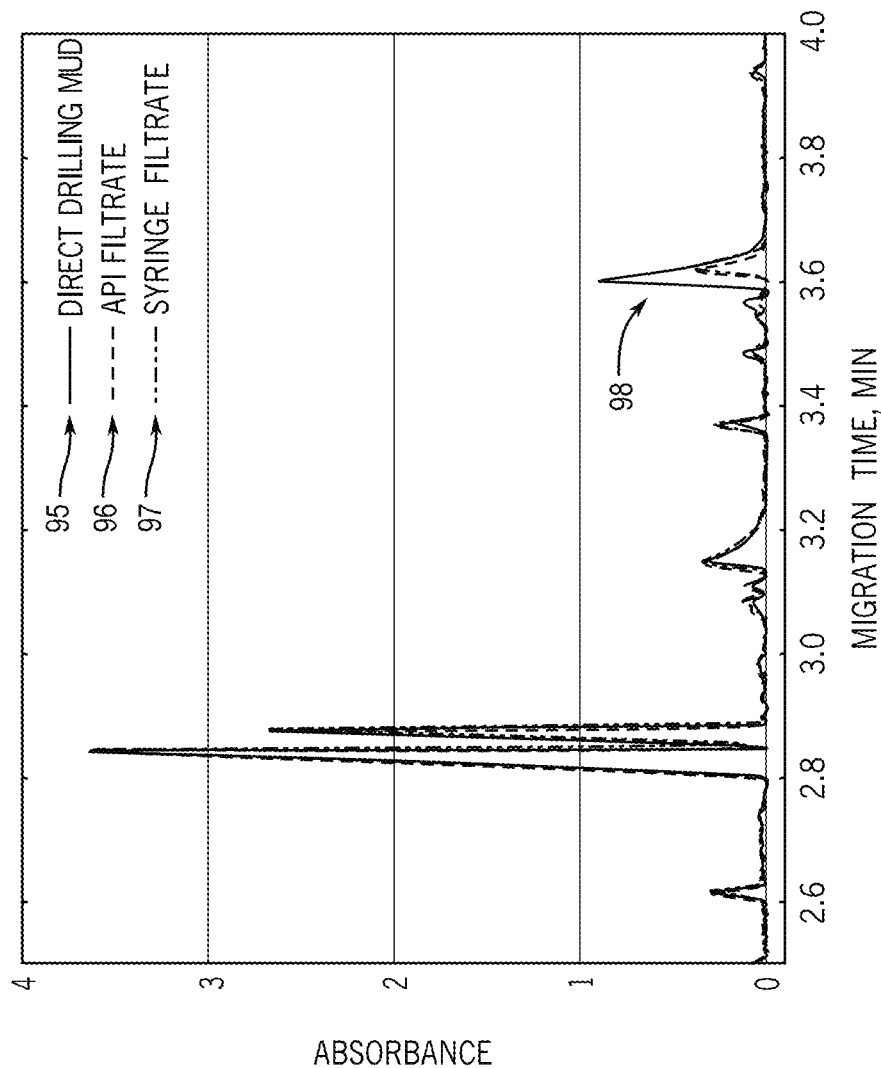
FIG. 5 illustrates an example of a graph that shows variations in the concentration of species of a drilling fluid without filtration of the drilling fluid and with filtration of the drilling fluid via different filtration techniques, in accordance with at least one embodiment of the present disclosure.

FIG. 5 illustrates an example of a graph that shows variations in a concentration of an inhibitor of an analysis fluid without filtration of the analysis fluid and with filtration of the analysis fluid via different filtration techniques, in accordance with an embodiment of the present disclosure. In particular, a first line 95 may represent a respective electropherogram for a direct analysis fluid, a second line 96 may represent a respective electropherogram for an API filtrate of the analysis fluid, and a third line 97 may represent a respective electropherogram for a syringe filtrate of the analysis fluid. As shown, the electropherograms vary because the composition of the analysis fluid may be affected by filtration processes. For example, the first line 95 includes a peak 98 that is different than corresponding peaks in the second line 96 and the third line 97 (e.g., the peak 98 has a higher, larger area than the corresponding peaks in the second line 96 and the third line 97).

Advantageously, the fluid analysis system 12 and the CE device 60 may be capable of directly sampling the analysis fluid (e.g., without filtration to remove solids), which may provide more accurate results regarding the composition of the analysis fluid (e.g., that is delivered into and/or returned from the wellbore 14, instead of a filtered version of the analysis fluid). This also may enable effective testing on leachates from solids used in the drilling fluid and/or encountered (e.g., introduces to the drilling fluid) via interaction with the subterranean formation. More particularly, the analysis fluid may be sampled (e.g., provided to the sample vial 72 of FIG. 2 and introduced into the inlet of the capillary tube 66) from the drilling fluid tank 44 and/or from any of the fluid conduits 46, 52 without carrying out filtration processes, such as API filtration processes (e.g., to create an API filtrate) and/or syringe filtration processes (e.g., to create a syringe filtrate). However, it should be appreciated that the CE device 60 may also or instead be utilized to sample filtrates (e.g., API filtrates, syringe filtrates, and/or other filtrates).

In operation, the fluid analysis system 12 may determine and analyze component concentration trends, which include the respective rate of change of the concentration of one or more components (e.g., inhibitors, ions) of the drilling fluid. The fluid analysis system 12 may output the rate of change via the output device 84 (e.g., in real-time, upon completion of each test) to enable the operator to evaluate a subsurface fluid composition of the subterranean formation, and/or update the evaluation plan in real-time (for instance, by adding downhole measurements into a certain zone of interest of the wellbore).

It should be appreciated that the fluid analysis system 12 may be configured to carry out any of a variety of levels of processing, analysis, and/or control. As noted above, the fluid analysis system 12 may be configured to process the data from the detector 74 of FIG. 2 and output the respective concentrations of the components of the analysis fluid, and then the operator may carry out further analysis to assess the analysis fluid. However, in some embodiments, the fluid analysis system 12 may utilize one or more algorithms and/or look-up tables to carry out more advanced processing, analysis, and/or control. For example, the fluid analysis system 12 may utilize one or more algorithms and/or look-up tables that relate parameters relative to the drilling fluid samples taken, such as the respective rates of change of the components in the drilling fluid to the subsurface fluid composition, i.e., at least the target ion composition, and optionally the impurity species composition. Then, the fluid analysis system 12 may determine the subsurface fluid composition (advantageously per depth), and the fluid analysis system 12 may provide an output indicative of the subsurface fluid composition via the output device 84.

INDUSTRIAL APPLICABILITY

The present disclosure relates generally to sampling and evaluating one or more components of an analysis fluid. More particularly, the present disclosure relates to sampling and evaluating an analysis fluid and/or target ions in the analysis fluid.

A method for evaluating a target fluid composition is provided in the following disclosure. The method relates more specifically to obtain one or more samples of an analysis fluid that contains the target fluid, placing the samples into a capillary electrophoresis (CE) device, determining a concentration of at least a target ion in the sample using the CE device and evaluating at least a criterion relative to an extraction plan for extracting the target ion at the location based on the determined concentration.

The analysis fluid may be a brine collected at the location, or a wellbore fluid used in the wellbore location drilled in a geological formation at the location and returning from the geological formation. The brine may include seawater, brackish water, leach fluids, waste water, a subsurface fluid or a combination thereof. The brine is generally the target fluid, the concentration of the target ion in the target fluid may be inferred directly from the sample.

When the brine is a subsurface fluid, it may be more complicated to collect a brine sample. In an embodiment, obtaining one or more samples includes lowering a downhole tool and collecting the sample downhole. This may be performed using a sampling apparatus and collecting the sample downhole includes contacting the sampling apparatus with the geological formation so that it is in fluid communication with the geological formation and withdrawing fluid from the geological formation. Sampling apparatuses are well-known in the art and examples of such tool include a Modular Formation Tester (MDT) tool commercially available from SLB.

When the brine is subsurface brine, another possibility is to analyze a wellbore fluid as the analysis fluid, knowing that said wellbore fluid returning to the surface after having circulated through the wellbore contains small amount of subsurface fluid that has been mixed with the wellbore fluid and inferring from the concentration of the at least one target ion in the wellbore fluid an indication of a concentration of the at least one target ion in the subsurface fluid contained in the wellbore fluid. The wellbore fluid may be a drilling fluid, an injection fluid, a stimulation fluid and more generally any fluid that is injected in the wellbore.

The method will be described in more details in relationship with the embodiment where the analysis fluid is a wellbore fluid, as the inference of the subsurface fluid concentration is more complex.

Once the concentration of the target ion (and possibly other species such as impurity species) has been inferred, it is used to evaluate at least a criterion relative to an extraction plan for extracting the target ion at the location based on the determined concentration. Impurity species may include organics, such as hydrocarbons, sulfide species such as $H_2S$, $HS^-$ or $S^{2-}$, derivatives containing silicon and silica species, divalent ions such as magnesium and calcium, aluminum, barium, strontium; transition metals such as iron, manganese, zinc; boron, strontium, derivatives containing phosphorus and phosphate (to the extent such species is not the target ion).

Such criterion may relate to profitability of the target ion extraction. Indeed, depending on the configuration at the location, and on the target ion concentration and/or other impurity species in the target fluid, a techno-economical assessment of the extraction may be performed and a decision on the target ion extraction at the predetermined location may be taken.

Such criterion may also relate to the extraction flowsheet design. Indeed, an extraction flowsheet is highly dependent on the target fluid composition and knowing this composition in advance enables to design the extraction flowsheet in an optimal fashion. Based on this composition, for instance a target ion extraction process may be selected (for instance, ion exchange, adsorption/desorption, electrochemical extraction) and/or the parameters of the target ion extraction process may be determined (for instance, flow, extraction time, etc.). The concentration of the target ion as well as the ratio of the target ion to one or more specific impurity species are very interesting parameters that enable to select the extraction process and its parameters. Based on this composition (and especially the impurity species concentration), the presence of one or more additional stages in the extraction flowsheet may be determined, such as concentration and/or impurity removal before extraction and/or the nature of such concentration and impurity removal stages.

Such criterion may also relate to an evaluation plan in the case where the analysis fluid is a wellbore fluid. Indeed, having a first understanding of the subsurface fluid composition using the wellbore fluid is helpful, but this analysis is not as accurate as a downhole measurement. Hence, based on the concentration of the target ion in the samples, the method may include selecting one or more additional evaluation measurements, and/or collecting one or more samples of subsurface fluid at one or more target depths in the wellbore to obtain additional data relative to the subsurface fluid before proceeding with the extraction process evaluation and/or design. For a better evaluation plan, the several samples of the wellbore fluid may be evaluated at different times using the CE, and depth matching is performed to identify a subsurface fluid composition relative to known depths.

In some embodiments, the analysis fluid is a wellbore fluid, and evaluating the criteria may be relative to the wellbore design. The method may, for instance, include selecting one or more extraction zones, and the method may include sealing the selected extraction zones within the wellbore so that fluid is extracted solely from the selected extraction zones. Indeed, the wellbore fluid analysis and depth matching (as will be discussed later) enable identification of the wellbore zones where the brine or other subsurface fluid can be sampled from the formation in order to isolate it from the other fluids that are in fluid communication with the wellbore in order to avoid contamination by other fluids.

Hereinafter is described a CE system used to evaluate a target ion concentration in a sample from an analysis fluid. The CE system is designed for inline measurement. In some embodiments, other type of CE systems (and for instance not inline) are used in the scope of the disclosure.

As discussed hereinabove, CE may be used to detect and monitor target ion (and possibly other species, such as impurity species) concentration in brine or other subsurface fluid streams.

In some embodiments, an inline CE device (also named analyzer in the following) receives analysis fluid from a brine stream. While the present embodiment described herein describes a brine stream, it should be understood that the described components may be applicable to other subsurface fluids. The brine stream is generally depicted flowing in a pipe, with the analyzer coupled to the pipe by a sampling system. The sampling system is depicted as obtaining samples from two sampling locations, but a sampling system may be designed to obtain fluid for only one or more than two locations. One sampling location, or more than two sampling locations, can be used with one analyzer. A selection valve is operable to draw samples selectively from either sampling location or. A sample line brings material from the selection valve to a sample chamber, which stages the sample for analysis. A solvent source is coupled to the sample chamber by a pump so that solvent can be provided to the sample chamber to dilute the sample, if desired. The solvent can also be used to flush the sample chamber between samples. A second selection valve is coupled to an outlet of the sample chamber. Flush material can be routed from the solvent source to the sample chamber, and then to the first selection valve for disposal along a first flush line. Alternately, flush material can be routed from the solvent source to the sample chamber, and then to the second selection valve for disposal along a second flush line or to an analyzer feed line. A first block valve can be operated to route the flush material along the first flush line, and a second block valve can be operated to route the flush material along the second flush line. The sampling system can thus have zero, one, two, or more flush lines. A sample fitting may be coupled to the analyzer feed line to allow for disconnecting the analyzer from the sampling system, in the event a portable analyzer is used. Note that other valves, tubes, and/or pipes that may be appropriate for flowing samples to and from the analyzer are omitted for simplicity of explanation.

The analyzer generally has a capillary tube juxtaposed with an electric field source that when energized creates an electric field oriented along an axis of the capillary tube. The electric field source comprises a cathode and an anode positioned at either end of the capillary tube. In most cases, the cathode and anode are immersed in the fluid being analyzed to propagate the electric field through the fluid. A power supply (not shown) powers the electric field source. The capillary tube has an entrance end and an exit end. A detector cell is coupled to the capillary tube at or adjacent to the exit end. The detector cell applies probe energy to the fluid in the capillary tube to produce a signal representing the composition of the fluid in the capillary tube. The detector cell may be a UV transmission cell, an electrical conductivity cell, a mass spectrometry cell, or other suitable detector type. The detector cell generally comprises an energy source and a detector oriented to couple the probe energy into the fluid within the capillary tube and to detect energy emerging from the capillary tube following interaction with the fluid therein. Effect of the fluid on the energy is resolved by the detector as a signal, or a plurality of signals, such as a spectrum or an intensity of one wavelength or a small collection of wavelengths, that relates to the composition of the fluid.

In one embodiment, the energy source is an ultraviolet light (UV) source and the detector is a UV detector. The UV source may use a single wavelength or multiple wavelengths. In some cases, a broadband UV source may be used, and the detector may be a spectrometer to resolve transmission of different wavelengths. A usable CE instrument is commercially available from multiple suppliers. UV wavelengths such as 200 nm and 214 nm are usable. In other embodiments, the energy source may be an electric current source and the detector may be a conductivity detector. In still other embodiments, the energy source may be a magnet to deflect ions moving through the magnetic field of the magnet toward an ion detector, similar to a mass spectrometer. The ion detector can differentiate ions by migration time or detection location.

The sampling system has a sample chamber that holds a fluid to be routed to the capillary tube. The sample chamber collects a sample of a prescribed size for flowing through the capillary tube. The sample is hydrodynamically injected into the capillary tube from the sample chamber, either by applying positive pressure or vacuum to the sample chamber, while electric field is applied by the source. Here, a pressure source is fluidly coupled to the sample chamber to provide pressure to hydrodynamically inject the sample from the sample chamber into the capillary tube. The pressure source can provide a pressurized gas into the sample chamber to hydrodynamically inject the sample from the sample chamber into the capillary tube without altering the liquid composition of the sample. The sample can also be electrokinetically injected into the capillary tube by fluidly connecting the sample chamber to the capillary tube, maintaining neutral hydrodynamic pressure from the sample chamber through the capillary tube, and coupling the electric field into the fluid. The pressure source can be configured to maintain neutral pressure in the sample chamber during the injection process. The electric field acts to affect the rate at which species in the sample arrive at the detector cell. The detector cell records a time-series of transmission intensity, while the sample flows through the capillary tube, which can be related to composition of the sample.

The analyzer can be operated under isothermal conditions by controlling temperature within the capillary tube. A thermal control member can be coupled to the capillary tube to control temperature within the capillary tube. The thermal control member can be a fluid jacket or resistive heat jacket, or both, for raising or lowering a temperature of the fluid flowing through the capillary tube in order to control the temperature of the fluid. A fluid jacket can use a liquid or gas as a thermal control medium to exchange thermal energy with the fluid flowing through the capillary tube to heat or cool the fluid flowing through the capillary tube to control the temperature of the fluid flowing through the capillary tube to maintain isothermal operating conditions for the analyzer. One or more temperature sensors can be coupled to the capillary tube for sensing the temperature of the fluid flowing through the capillary tube. The thermal control member can be operated based on readings from the one or more temperature sensors to maintain isothermal conditions for operation of the analyzer. The analyzer, with sampling system, is an example of a CE system that can be used to detect, monitor, and control composition of material flowing through the pipe. Any type of CE system can be used in the scope of the disclosure.

The sampling system is configured, in this case, to operate substantially independently from the analyzer. The sampling system is configured to automatically collect and prepare a sample for analysis by the analyzer without impacting operation of the analyzer. To prepare a sample for analysis, a controller (not shown), or a human operator, can open valve to allow flow of fluid from the pipe to the sample chamber through the sample line. The selection valve can be set to allow flow from one or both the sampling locations and to the sample chamber. Solvent can be routed to the sample chamber from the solvent source. One or both of the valve and the valve associated with the sample fitting can be kept closed to isolate the sampling system from the analyzer while the sample is being prepared. The pressure source, or other means, can be used to maintain a target pressure in the sample chamber while fluids are flowed into the sample chamber. In an alternate method, a sample can be prepared in the sample chamber by simultaneously flowing fluid from the pipe through the sample chamber to the second selection valve and into the second flush line and flowing solvent from the solvent source through the sample chamber to the second selection valve and the second flush line. When a steady flow state is established through the sample chamber, valve can be closed to stop flow and valve can then be closed to isolate the sample. When the analyzer is prepared to accept the sample, the second selection valve can be set to flow from the sample chamber to the analyzer, the valve can be opened, and the pressure source can be used to inject the sample from the sample chamber to the analyzer through the analyzer feed line.

The analyzer can be calibrated for analyzing one or more specific target ion, such as lithium, in brine streams in three general ways. First, a known solution can be used a calibrant. For lithium, the solution may be a solution of a lithium salt, such as lithium chloride. A known amount of lithium salt is dissolved in deionized water to yield a solution of known lithium concentration. Standard solutions can also be obtained from vendors of such materials. When this solution is measured using the analyzer, the resulting signature can be related to the known lithium concentration. Multiple such calibrants having different lithium concentration can be analyzed to develop a calibration curve. Second, a known mixture of species including target ion and other species can be prepared and analyzed. For example, a known quantity of a salt containing lithium, for example lithium chloride, along with known quantities of calcium, magnesium, sodium, which may be chlorides and/or other anions, can be added to deionized water to prepare calibrants for analysis. In this way, a multivariate calibration curve can be constructed. Most modern instruments have software or firmware for calibration of this type. A third way of calibrating the instrument is to obtain wild brine samples from a natural source, analyze them using well-characterized procedures to determine a high-confidence composition of the natural source, and then analyze them using the analyzer. Hybrid methods can be used also, for example a natural brine sample that is adjusted in some way to optimize the calibration. In these ways, the results of the analyzer can be related to another well-known analytical technique.

In view of the above the CE device is able to infer target ion concentration in the sample and therefore in the analysis fluid. When the analysis fluid is the brine, it can directly infer the concentration in the brine and the one or more criteria discussed above may be evaluated based directly on the results of the CE device analysis.

In some embodiments, the method and associated system are described in relationship with the embodiment where the analysis fluid is a wellbore fluid. In that case, as explained above, the analysis fluid is not directly the target fluid but contains amounts (sometimes small amounts) of the target fluid.

As discussed above in relationship with some embodiments, a drilling system may carry out drilling operations to form a wellbore within or into a subterranean formation to recover subsurface fluids (such as hydrocarbons and/or brines including one or more target ions of interest such as lithium, nickel, cobalt, manganese or magnesium) trapped within the subterranean formation. During drilling operations, drilling fluid (e.g., drilling mud) flows through a drill string, out a drill bit at a distal end of the drill string, and then upward through an annular passage between the drill string and a wall of the wellbore. The drilling fluid is generally used for lubrication and cooling of cutting surfaces of the drill bit while drilling generally or drilling-in (e.g., drilling in a targeted petroliferous formation), for transportation of cuttings (e.g., pieces of subterranean formation dislodged by a cutting action of teeth on the drill bit) to the surface, controlling formation fluid pressure to block blowouts, maintaining wellbore stability, suspending solids in the wellbore, minimizing fluid loss into and stabilizing the subterranean formation through which the wellbore is being drilled, fracturing the subterranean formation in the vicinity of the wellbore, displacing fluid within the wellbore with another fluid, cleaning the wellbore, testing the wellbore, treating the wellbore, treating the subterranean formation, transmitting hydraulic horsepower to the drill bit, emplacing a packer, abandoning the wellbore, and/or preparing the wellbore for abandonment, for example. After having carried out its function in the wellbore, the drilling fluid is returned to the surface and to the fluid pits or tanks.

The present embodiments relate to a fluid analysis system that uses CE techniques to determine a concentration of at least a target ion, optionally the concentration of at least an impurity species, optionally the composition of the drilling fluid returning from the wellbore. Indeed, the CE techniques may be used to test for respective concentrations of all components/ingredients in the drilling fluid or other analysis fluid returning from the wellbore (including components/ingredients leached from the subterranean formation such as target ion). The CE techniques may be implemented via a CE device or system that is portable and/or present at a wellsite (e.g., in a vicinity of the wellbore, such as within 25, 50, or 100 meters of the wellbore), and thus, the CE techniques may provide real-time (e.g., substantially real-time, such as within minutes and/or during the drilling operations) quality analysis/control at the wellsite. Notably, the CE techniques may not require and/or do not utilize an addition of any tracer to the drilling fluid to determine the composition of the drilling fluid or other analysis fluid returning from the wellbore. Additionally, the CE techniques may be performed on direct drilling muds (e.g., direct drilling fluids; without filtration), which may reduce a time to test the drilling fluid and/or provide more accurate results (e.g., as compared to titration-based tests).

The CE techniques may provide the respective concentrations of the components of the drilling fluid. The detailed, robust outputs provided by the CE techniques may provide information about a formation composition of the subterranean formation. These and other features of the fluid analysis system are described in more detail herein.

A drilling system has a fluid analysis system (e.g., drilling mud analysis system), in accordance with some embodiment of the present disclosure. The fluid analysis system is configured to analyze a composition of a drilling fluid, provide feedback (e.g., visual feedback via a display screen), and/or carry out other tasks to evaluate the subsurface fluid composition. It should be understood that the disclosed embodiments may be adapted for use with a land-based drilling system or an offshore drilling system.

As shown, a wellbore is formed in a subterranean formation, and a drill string is suspended within the wellbore. The drill string may include a drill bit that cuts through the subterranean formation to form or to drill the wellbore. A mast is positioned on a drill floor and over the wellbore. A hoisting system includes a crown block, a traveling block, and a drawworks system. A cable (e.g., wire) extends from the drawworks system and couples the crown block to the traveling block. In the illustrated embodiment, a top drive is coupled to the traveling block. The top drive rotates the drill string as the hoisting system raises and lowers the top drive and the drill string relative to the drill floor to facilitate drilling of the wellbore. It should be appreciated that hoisting systems having various other components (e.g., swivels) and/or configurations may be utilized to drive movement of the drill string.

A pump (e.g., piston pump) is configured to pump a drilling fluid (e.g., drilling mud; water-based, oil-based, or synthetic-based drilling fluid) into the wellbore. For example, the pump may be used to pump the drilling fluid from a drilling fluid tank during drilling operations. In particular, the pump may be used to pump the drilling fluid from the drilling fluid tank, through a fluid conduit (e.g., pipe, line), through a port in the top drive, and into an interior channel in the drill string. The drilling fluid may exit the drill string via ports in the drill bit, and then circulate upwardly through an annular passage between an outer surface (e.g., annular surface) of the drill string and an inner surface (e.g., annular surface) that defines the wellbore. The drilling fluid may then return to the drilling fluid tank via a fluid conduit (e.g., pipe).

It is important to evaluate the concentration of one or more target ions (i.e., that may be extracted) as well as optionally of one or more impurity species (i.e., that may be detrimental to the extraction). The subsurface fluid may be mixed in the wellbore with the drilling fluid and such target ions and/or impurity species that are in the subsurface fluid may be found mixed into or incorporated into the drilling fluid that returns to the surface. Accordingly, the fluid analysis system disclosed herein includes a CE device (or CE system) that enables sampling and testing of the analysis fluid (i.e., including the drilling fluid and a subsurface fluid), such as during the drilling operations and/or nearby the wellbore (e.g., in a vicinity of the wellbore, such as within 25, 50, or 100 meters of the wellbore). More particularly, the CE device may be configured to analyze the composition of the analysis fluid, such as respective concentrations of target ions and impurity species contained in the analysis fluid. For example, the CE device may be configured to analyze the respective concentrations of one or more additives (e.g., inhibitors), one or more ions, and so on. The CE device may rely upon minimum, or in some cases, no preparation of a sample of the analysis fluid (e.g., no addition of tracers, such as nitrate; supplied directly from the drilling fluid tank and/or any of the fluid conduits; without filtration to remove solids).

As shown, the CE device may include a source vial, a destination vial, a capillary tube, electrodes, and a power supply. The source vial, the destination vial, and the capillary tube may be filled with an electrolyte, such as an aqueous buffer solution. To introduce a sample (e.g., of the analysis fluid, the drilling fluid), an inlet of the capillary tube may be placed into a sample vial that contains the sample. The sample may be introduced into the capillary tube via capillary action, pressure, siphoning, or electrokinetically, and the inlet of the capillary tube is then returned to the source vial.

In some embodiments, migration of components in the sample is initiated by an electric field that is applied between the source vial and the destination vial by the electrodes connected to the power supply. In certain CE techniques, ions are pulled through the capillary tube in one direction by electroosmotic flow. The components separate as they migrate due to their different electrophoretic mobility and are detected by a detector (e.g., ultraviolet (UV) or ultraviolet-visible (UV-VIS) absorption detector, mass spectrometer, fluorescence detector, electrochemical detector, conductivity detector, and/or optical detector) near an outlet of the capillary tube. An output of the detector may be provided to a processing device or system, which may include a processor, a memory device, a storage device, a communication device, and/or an output device (e.g., a speaker, a light emitter, and/or a display screen).

The processor may be any type of computer processor or microprocessor capable of executing computer-executable code. The memory device and the storage device may be any suitable articles of manufacture that can serve as media to store processor-executable code, data (e.g., calibration curves), or the like. These articles of manufacture may represent computer-readable media (e.g., any suitable form of memory or storage) that may store the processor-executable code used by the processor to perform various techniques disclosed herein. The memory device and the storage device may represent non-transitory computer-readable media (e.g., any suitable form of memory or storage). It should be noted that non-transitory merely indicates that the media is tangible and not a signal.

The communication device may be configured to facilitate communication between the fluid analysis system and other components of the drilling system (e.g., via a wired and/or wireless network). For example, the communication device may communicate data, information, alerts, recommendations, and/or control signals to other components of the drilling system. The output device may operate as a human machine interface (HMI) to depict visualizations associated with software or executable code being processed by the processor. For example, the output device may be a display screen, such as a touch display screen that is also capable of receiving inputs from an operator (e.g., a mud engineer; a human operator). The output device may be any suitable type of display screen, such as a liquid crystal display (LCD) screen, plasma display screen, or an organic light emitting diode (OLED) display screen, for example.

It should be noted that the components described above with regard to the fluid analysis system are merely examples, and the fluid analysis system may include additional or fewer components. In some embodiments, the fluid analysis system may be a distributed system that includes multiple processors. Indeed, as used herein, the term "processing device or system" refers to an electronic computing device or system such as, but not limited to, a single computer, virtual machine, virtual container, host, server, laptop, and/or mobile device, or to multiple electronic computing devices working together to perform the function(s) described herein.

While only certain features of the invention have been illustrated and described herein, many modifications and changes will occur to those skilled in the art. It is, therefore, to be understood that the appended claims are intended to cover all such modifications and changes as fall within the true spirit of the invention. Furthermore, features described herein may be combined in any suitable manner.

In some embodiments, systems and methods for evaluating a target fluid are described and encompassed by at least the following clauses:

Clause 1. A method of evaluating a target fluid composition, the method comprising: obtaining one or more samples of an analysis fluid obtained at a predetermined location and containing a target fluid; placing the one or more samples into a capillary electrophoresis device; determining a concentration of at least a target ion in the sample using the capillary electrophoresis device; and evaluating at least a criterion relative to an extraction plan for extracting the target ion at the location based on the determined concentration.

Clause 2. The method of clause 1, wherein the analysis fluid is a brine collected at the predetermined location, or a wellbore fluid used in a wellbore location drilled in a geological formation at the predetermined location and returning from the geological formation.

Clause 3. The method of clause 2, wherein the brine includes seawater, brackish water, waste water, a leachate fluid, a subsurface fluid, or a combination thereof.

Clause 4. The method of clause 1, wherein the target fluid is a subsurface fluid, and wherein obtaining the one or more samples includes lowering a downhole tool and collecting the sample downhole.

Clause 5. The method of clause 4, wherein the downhole tool includes a sampling apparatus, and collecting the sample downhole includes contacting the sampling apparatus with the geological formation so that it is in fluid communication with the geological formation and withdrawing fluid from the geological formation.

Clause 6. The method of clause 4 or 5, wherein the capillary electrophoresis device is in the downhole tool.

Clause 7. The method of any of clauses 2 to 6, wherein the wellbore fluid includes a drilling fluid, a stimulation fluid, or a combination thereof.

Clause 8. The method of any preceding clause, wherein the target fluid is a subsurface fluid and the analysis fluid is a wellbore fluid and the method includes inferring from the concentration of the at least one target ion in the wellbore fluid an indication of a concentration of the at least one target ion in the subsurface fluid contained in the wellbore fluid.

Clause 9. The method of clause 8, further comprising: obtaining a plurality of samples of the wellbore fluid, wherein each sample of the plurality of samples is obtained at a different time over a time period; placing the plurality of samples into the capillary electrophoresis device; determining a respective concentration of the at least one target ion in each of the plurality of samples of the wellbore fluid; and evaluating the at least one criterion based on the respective concentration of the at least one target ion in each of the plurality of samples.

Clause 10. The method of clause 9, including determining an indication of a concentration of the at least one target ion in the subsurface fluid for at least two target depths of the wellbore using the respective concentration of the at least one target ion in each of the plurality of samples of the wellbore fluid.

Clause 11. The method of clause 10, wherein evaluating the at least one criterion includes selecting one or more wellbore extraction zones, and the method further comprising collecting one or more samples of subsurface fluid at the at least two target depths in the wellbore extraction zones.

Clause 12. The method of any of clauses 9-11, wherein the capillary electrophoresis device is in fluid communication with a wellbore fluid return line between the wellbore and a tank storing the wellbore fluid and wherein placing the one or more samples into the capillary electrophoresis device includes routing a stream of the wellbore fluid to the capillary electrophoresis device.

Clause 13. The method of any of clause 9-12, wherein a first sample of the plurality of samples of the wellbore fluid returning from the wellbore is obtained at a first time; and wherein the method further comprises: calculating a lag time corresponding to a time period during which the wellbore fluid is in the wellbore, obtaining a second sample of the wellbore fluid before the wellbore fluid enters the wellbore at a second time earlier than the first time, wherein the time period between the first and second time corresponds to the lag time, comparing the first sample to the second sample, and inferring the concentration of the target ion in the subsurface fluid based on the comparison of the first sample to the second sample.

Clause 14. The method of any preceding clause, wherein the target ion includes one or more of lithium, nickel, manganese, cobalt, or magnesium.

Clause 15. The method of any preceding clause, further comprising determining a concentration of one or more impurity species; and using the concentration of the impurity species in the evaluation of the at least one criterion relative to the extraction plan.

Clause 16. The method of clause 15, wherein the one or more impurity species includes organic species; hydrocarbon species; sulfide species; H2S; HS−; S2−; derivatives containing silicon and silica species; divalent ions including strontium, magnesium, or calcium; aluminum; barium; strontium; transition metals including iron, manganese, zinc, boron; derivatives containing phosphorus or phosphate; or a combination thereof.

Clause 17. The method of any preceding clause, wherein the criterion relates to one or more of extraction profitability, extraction flowsheet design, evaluation plan, and wellbore design.

Clause 18. The method of clause 17, wherein evaluating the one or more criteria relative to the extraction plan includes one or more of: selecting a target ion extraction process and determining parameters of the target ion extraction process; selecting one or more additional stages in the extraction flowsheet design; and selecting one or more extraction zones in the wellbore.

Clause 19. The method of clause 18, further comprising sealing at least a portion of the wellbore to isolate at least one selected extraction zone.

Clause 20. The method of any preceding clause, further including designing an extraction plan based on the at least one evaluated criterion.

Clause 21. The method of any preceding clause, comprising placing the at least one sample into the capillary electrophoresis device without filtration.

Clause 22. The method of clause 21, wherein the at least one sample is a drilling fluid.

Clause 23. The method of any preceding clause, comprising filtering at least one sample to create a filtrate prior to placing the at least one sample into the capillary electrophoresis device, such that placing the at least one sample into the capillary electrophoresis device comprises placing the filtrate into the capillary electrophoresis device, and determining the respective concentration of a component in the at least one sample comprises determining the respective concentration of the component in the filtrate.

Clause 24. The method of any preceding clause, wherein placing the sample into the capillary electrophoresis device includes flowing the sample into the electrophoresis device.

Clause 25. The method of clause 24, wherein the capillary electrophoresis device is in fluid communication with a container or a pipe containing the analysis fluid.

Clause 26. A method of evaluating a target fluid composition, the method comprising: obtaining a plurality of samples of an analysis fluid at different times or different location over a time period; flowing a first sample of the plurality of samples into a capillary electrophoresis device; determining a first concentration of at least one target ion in the first sample; flushing the capillary electrophoresis device; flowing a second sample of the plurality of samples into the capillary electrophoresis device; determining a second concentration of the at least one target ion in the second sample; and evaluating at least one criterion based on a comparison of the first concentration to the second concentration.

Clause 27. The method of clause 26, wherein obtaining a plurality of samples of the analysis fluid at different times includes changing a period between samples based at least partially on the comparison of the first concentration to the second concentration.

Clause 28. A system for evaluating a target fluid composition including: a capillary electrophoresis device; a sampling apparatus configured to obtain one or more samples of an analysis fluid containing the target fluid at a predetermined location and to place it in the capillary electrophoresis device; and a processing device including one or more processors configured to: determine a concentration of at least a target ion in the one or more samples using the capillary electrophoresis device, and evaluate at least a criterion relative to an extraction plan for extracting the target ion at the location based on the determined concentration.

Clause 29. The system of clause 28, wherein the analysis fluid is a brine collected at the location, or a wellbore fluid used in the wellbore location drilled in a geological formation at the location and returning from the geological formation.

Clause 30. The system of clause 29, wherein the brine includes seawater, brackish water, waste water, leachate fluid, a subsurface fluid or a combination thereof.

Clause 31. The system of clause 30, wherein the target fluid is a subsurface fluid, and wherein obtaining the system includes a downhole tool containing the sampling apparatus.

Clause 32. The system of clause 31, wherein the sampling apparatus has a moving element configured to contact with the geological formation so that it is in fluid communication with the geological formation and means for withdrawing fluid from the geological formation.

Clause 33. The system of clause 32, wherein the capillary electrophoresis device is situated in the downhole tool.

Clause 34. The system of any of clauses 29 to 33, wherein the wellbore fluid includes at least one of a drilling fluid, an injection fluid, and a stimulation fluid.

Clause 35. The system of any of clauses 28 to 34, wherein the target fluid is a subsurface fluid and the analysis fluid is a wellbore fluid and the processing device is configured for inferring from the concentration of the at least one target ion in the wellbore fluid an indication of a concentration of the at least one target ion in the subsurface fluid contained in the wellbore fluid.

Clause 36. The system of any of clauses 28 to 35, wherein the sampling apparatus is configured to receive a plurality of samples of the analysis fluid at different times over a time period and place said samples in the capillary electrophoresis device, and wherein the processing device is configured to: determine a respective concentration of the at least one target ion in each of the plurality of samples of the analysis fluid, and evaluate the at least one criterion based on the respective concentration of the at least one target ion in each of the plurality of samples.

Clause 37. The system of clause 36, wherein the processing device is configured for determining an indication of a concentration of the at least one target ion in a subsurface fluid in fluid communication with the wellbore fluid for at least a first depth of the wellbore and a second depth of the wellbore using the respective concentration of the at least one target ion in each of the plurality of samples of the wellbore fluid.

Clause 38. The system of clause 37, wherein the processing device is configured for selecting one or more wellbore extraction zones, and wherein the system further includes a downhole sampling apparatus configured for collecting one or more samples of subsurface fluid, wherein the processing device controls the downhole sampling apparatus so that it collects a plurality of samples at one or more target depths in the wellbore extraction zones.

Clause 39. The system of any of clauses 28 to 38, wherein the sampling apparatus and the capillary electrophoresis device are in fluid communication with a wellbore fluid return line situated between the wellbore and a tank storing the wellbore fluid.

Clause 40. The system of any of clauses 28 to 39, wherein the sample of a wellbore fluid returning from the wellbore is obtained at a first time, wherein the sampling apparatus is configured for collecting a sample of the wellbore fluid in an entry line of the wellbore, wherein the processing device is configured for calculating a lag time, corresponding to a time period during which the wellbore fluid is in the wellbore, controlling the collection of a sample of the wellbore fluid in the entry line at a second time earlier than the first time, wherein the time period between the first and second time corresponds to the lag time and inferring the concentration of the target ion in a subsurface fluid based on the comparison.

Clause 41. The system of any of clauses 28 to 40, wherein the target ion includes one or more of lithium, nickel, manganese, cobalt, or magnesium.

Clause 42. The system of any of clauses 28 to 41, wherein the processing device is configured for determining a concentration of one or more impurity species and using the concentration of the one or more impurity species in the evaluation of the at least one criterion relative to an extraction plan.

Clause 43. The system of clause 42, wherein the one or more impurity species includes organic species; hydrocarbon species; sulfide species; H2S; HS–; S2—; derivatives containing silicon and silica species; divalent ions including strontium, magnesium, or calcium; aluminum; barium; strontium; transition metals including iron, manganese, zinc, boron; derivatives containing phosphorus or phosphate; or a combination thereof.

Clause 44. The system of any of clauses 28 to 43, wherein the criterion relates to one or more of: extraction profitability; extraction flowsheet design; evaluation plan; and wellbore design.

Clause 45. The system of any of clauses 28 to 44, wherein the processing device is configured for one or more of: selecting a target ion extraction process and/or determining parameters of the target ion extraction process; selecting one or more additional stages in an extraction flowsheet design; and selecting one or more extraction zones in a wellbore.

Clause 46. The system of any of clauses 28 to 45, wherein the analysis fluid is a wellbore fluid, wherein the processing device is configured for selecting one or more additional evaluation measurements, and/or controlling collection of one or more samples of subsurface fluid at target depth in the wellbore.

Clause 47. The system of any of clauses 28 to 46, wherein the processing device is configured for designing an extraction plan based on the at least one evaluated criterion.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform) ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method of evaluating a target fluid composition, the method comprising:
    obtaining a plurality of samples of an analysis fluid obtained at a predetermined location, the analysis fluid containing a target fluid, a first sample, among the plurality of samples of the analysis fluid, being obtained at a first time;
    placing the plurality of samples into a capillary electrophoresis device;
    determining a concentration of at least one target ion in the target fluid of the plurality of samples using the capillary electrophoresis device, the determining comprising:
        calculating a first time period during which the analysis fluid is in a wellbore;
        obtaining a second sample of the analysis fluid, among the plurality of samples of the analysis fluid, before the analysis fluid enters the wellbore at a second time earlier than the first time, a second time period between the first and second time being a lag time, the lag time corresponding to the first time period during which the analysis fluid is in the wellbore;
        comparing a composition of the first sample to a composition of the second sample; and
        inferring the concentration of the at least one target ion in the target fluid based on the comparing of the composition of the first sample to the composition of the second sample; and
    evaluating at least one criterion relative to an extraction plan for extracting the at least one target ion at the location based on the determined concentration.

2. The method of claim 1, wherein the analysis fluid comprises:
    a brine collected at the predetermined location; or
    a wellbore fluid used in a wellbore location drilled in a geological formation at the predetermined location and returning from the geological formation.

3. The method of claim 2, wherein the wellbore fluid comprises a stimulation fluid, a drilling fluid, or a combination thereof.

4. The method of claim 2, further comprising analyzing an initial composition of the wellbore fluid before injecting the wellbore fluid in the wellbore.

5. The method of claim 1, wherein;
    the target fluid is a subsurface fluid; and
    the obtaining the plurality of samples comprises:
        lowering a downhole tool downhole; and
        collecting the plurality of samples downhole.

6. The method of claim 5, wherein:
    the downhole tool comprises a sampling apparatus; and
    the collecting the plurality of sample downhole comprises:

contacting the sampling apparatus with a geological formation so that the sampling apparatus is in fluid communication with the geological formation; and withdrawing fluid from the geological formation.

7. The method of claim 6, wherein the capillary electrophoresis device is in the downhole tool.

8. The method of claim 1, wherein:

the target fluid is a subsurface fluid;

the analysis fluid is a wellbore fluid; and the method further comprises inferring, from the concentration of the at least one target ion in the wellbore fluid, an indication of a concentration of the at least one target ion in the subsurface fluid contained in the wellbore fluid.

9. The method of claim 8, further comprising:

obtaining each sample of the plurality of samples at a different time over a time period;

placing the plurality of samples into the capillary electrophoresis device;

determining a respective concentration of the at least one target ion in each of the plurality of samples of the wellbore fluid; and evaluating the at least one criterion based on the determined respective concentration of the at least one target ion in each of the plurality of samples.

10. The method of claim 1, wherein the at least one target ion comprises one or more of: lithium, nickel, manganese, cobalt, or magnesium.

11. The method of claim 1, wherein the evaluating the at least one criterion relative to the extraction plan comprises one or more of:

selecting a target ion extraction process and determining parameters of the target ion extraction process;

selecting one or more stages in an extraction workflow, the extraction workflow comprising a plurality of stages including a stage of selecting the target ion extraction process and determining parameters of the target ion extraction process, the selecting the one or more stages comprising selecting one or more stages other than the stage of selecting the target ion extraction process and determining parameters of the target ion extraction process; or selecting one or more extraction zones in the wellbore from which the plurality of samples are collected.

12. The method of claim 1, wherein;

the evaluating the at least one criterion comprises selecting one or more wellbore extraction zones; and the plurality of samples of the analysis fluid are collected at at least one target depth in the one or more wellbore extraction zones.

13. The method of claim 12, further comprising sealing at least a portion of the wellbore to isolate at least one selected extraction zone.

14. The method of claim 1, further comprising:

determining a concentration of one or more impurity species; and using the determined concentration of the one or more impurity species in the evaluating the at least one criterion relative to the extraction plan.

15. The method of claim 1, further comprising generating an extraction plan based on the evaluated at least one criterion.

16. The method of claim 1, further comprising:

filtering at least one sample to create a filtrate prior to the placing the at least one sample into the capillary electrophoresis device, the placing the at least one sample into the capillary electrophoresis device comprising placing the filtrate into the capillary electrophoresis device; and determining a respective concentration of a component in the at least one sample, the determining the respective concentration of the component comprising determining the respective concentration of the component in the filtrate.

17. A system for evaluating a target fluid composition, comprising:

a capillary electrophoresis device;

a sampling apparatus configured to obtain a plurality of samples of an analysis fluid containing the target fluid at a location, a first sample, among the plurality of samples of the analysis fluid, being obtained at a first time, a second sample, among the plurality of samples of the analysis fluid, being obtained before the analysis fluid enters a wellbore at a second time earlier than the first time, a first time period between the first and second time being a lag time, the lag time corresponding to a second time period during which the analysis fluid is in the wellbore; and a processing device comprising one or more processors configured to:

determine a concentration of at least one target ion in the target fluid of the plurality of samples using the capillary electrophoresis device, the determining comprising:

compare a composition of the first sample to a composition of the second sample; and infer the concentration of the at least one target ion in the target fluid based on the comparing of the composition of the first sample to the composition of the second sample; and evaluate at least one criterion relative to an extraction plan for extracting the at least one target ion at the location based on the determined concentration.

18. The system of claim 17, wherein:

the target fluid is a subsurface fluid; and the sampling apparatus is in a downhole tool.

19. The system of claim 18, wherein the capillary electrophoresis device is in the downhole tool.

* * * * *